(12) United States Patent
Sun

(10) Patent No.: US 11,641,960 B2
(45) Date of Patent: May 9, 2023

(54) COOLING BEDDING PRODUCT

(71) Applicant: MlilyUSA, Inc., Knoxville, TN (US)

(72) Inventor: Jian Sun, Rugao (CN)

(73) Assignee: MLILYUSA, INC, Knoxville, TN (US)

( * ) Notice: Subject to any disclaimer, the term of this patent is extended or adjusted under 35 U.S.C. 154(b) by 280 days.

(21) Appl. No.: 16/866,851

(22) Filed: May 5, 2020

(65) Prior Publication Data

US 2021/0345797 A1 Nov. 11, 2021

(51) Int. Cl.
| | |
|---|---|
| *A47G 9/10* | (2006.01) |
| *B29C 44/12* | (2006.01) |
| *B29L 31/00* | (2006.01) |
| *B29K 75/00* | (2006.01) |
| *B29K 105/00* | (2006.01) |

(52) U.S. Cl.
CPC ............ *A47G 9/1036* (2013.01); *B29C 44/12* (2013.01); *A47G 2009/1018* (2013.01); *B29K 2075/00* (2013.01); *B29K 2105/0061* (2013.01); *B29L 2031/751* (2013.01)

(58) Field of Classification Search
CPC .. A47C 7/18; A47C 7/021; A47G 2009/1018; A47G 9/10; A47G 9/1036; A47G 9/0253; A47G 9/1054; B29C 44/12; B29C 44/1266; B29K 2075/00; B29K 2105/0061; B29L 2031/751
See application file for complete search history.

(56) References Cited

U.S. PATENT DOCUMENTS

| | | | | |
|---|---|---|---|---|
| 5,226,188 A | * | 7/1993 | Liou ...................... | A47C 7/742 5/653 |
| 5,537,703 A | * | 7/1996 | Launder ................. | A47G 9/109 5/636 |
| 5,727,266 A | * | 3/1998 | Pang .................... | A47G 9/0253 5/636 |
| D672,183 S | | 12/2012 | Alletto | |
| D672,184 S | | 12/2012 | Alletto | |
| D672,186 S | | 12/2012 | Alletto | |

(Continued)

FOREIGN PATENT DOCUMENTS

| | | |
|---|---|---|
| CN | 202604320 U | 12/2012 |
| CN | 202681370 U | 1/2013 |

(Continued)

*Primary Examiner* — David R Hare
(74) *Attorney, Agent, or Firm* — Luedeka Neely Group, PC

(57) ABSTRACT

A bedding product having a cooling layer and a method therefor. The bedding product has a gel layer having an outside surface, a bonding surface opposite the outside surface, and a perimeter. A memory foam layer surrounds the perimeter and is disposed on the bonding surface. A textile layer having a first rectangular portion and a second rectangular portion affixed on a perimeter thereof to the first rectangular portion retains the gel layer and memory foam layer therebetween. The textile layer has a cooling surface, an opposing surface opposite the cooling surface, and at least one vent disposed adjacent to an edge portion of the first or second rectangular portion. The gel layer contains a plurality of hexagonal prism-shaped peaks and valleys on the outside surface thereof, and the gel layer and memory foam layer have a plurality of air conduits for air flow communication with the vent.

15 Claims, 4 Drawing Sheets

(56) References Cited

U.S. PATENT DOCUMENTS

| | | | |
|---|---|---|---|
| 8,646,134 B1* | 2/2014 | Alletto, Jr. | A47G 9/1054 5/636 |
| 8,887,332 B2 | 11/2014 | Alletto | |
| 9,015,883 B2 | 4/2015 | Alletto | |
| 9,138,084 B1* | 9/2015 | Namolovan | A47G 9/007 |
| 9,155,408 B2* | 10/2015 | Alletto, Jr. | A47G 9/1027 |
| 9,167,922 B1* | 10/2015 | Holbrook | A47G 9/10 |
| 9,167,923 B1* | 10/2015 | Holbrook | A47G 9/10 |
| 9,204,731 B2* | 12/2015 | Corodemus | A47G 9/0246 |
| 9,265,369 B1* | 2/2016 | Beliveau | A47G 9/10 |
| D759,404 S | 6/2016 | Alletto | |
| D759,405 S | 6/2016 | Alletto | |
| 9,380,895 B2* | 7/2016 | Dungan | A47G 9/1036 |
| 9,895,010 B1 | 2/2018 | Alletto | |
| 9,895,011 B2 | 2/2018 | Alletto | |
| 9,980,586 B2 | 5/2018 | Alletto | |
| 10,016,064 B2 | 7/2018 | Corodemus et al. | |
| 10,188,228 B2 | 1/2019 | Alletto | |
| 10,238,223 B2 | 3/2019 | Alletto | |
| 10,271,669 B2 | 4/2019 | Alletto | |
| D852,541 S* | 7/2019 | Beliveau | D6/601 |
| 10,413,100 B2 | 9/2019 | Alletto | |
| 10,842,301 B2* | 11/2020 | Werner | A47G 9/0253 |
| 2005/0223493 A1* | 10/2005 | Setokawa | A61F 7/02 5/636 |
| 2011/0061167 A1* | 3/2011 | Farley | A47G 9/10 83/13 |
| 2011/0185500 A1* | 8/2011 | Sanders | A47G 9/0207 428/35.2 |
| 2012/0073057 A1* | 3/2012 | Sramek | A47G 9/109 5/636 |
| 2014/0319890 A1* | 10/2014 | Rivera | A47C 7/18 297/452.41 |
| 2015/0040324 A1* | 2/2015 | Dungan | A47G 9/1036 5/644 |
| 2015/0272354 A1* | 10/2015 | Asklof | A47C 7/18 5/636 |
| 2015/0351563 A1 | 12/2015 | Alletto | |
| 2016/0015193 A1 | 1/2016 | Alletto | |
| 2016/0022063 A1* | 1/2016 | Fulkerson | A47G 9/10 5/636 |
| 2016/0073800 A1* | 3/2016 | Ives | A47C 27/085 5/636 |
| 2016/0166092 A1* | 6/2016 | Alletto, Jr. | A47G 9/10 5/636 |
| 2016/0331159 A1 | 11/2016 | Alletto | |
| 2016/0338514 A1* | 11/2016 | Chan | A47G 9/10 |
| 2017/0013977 A1* | 1/2017 | Bard | A47G 9/10 |
| 2017/0071372 A1 | 3/2017 | Alletto | |
| 2017/0071373 A1 | 3/2017 | Alletto | |
| 2017/0164754 A1 | 6/2017 | Alletto | |
| 2018/0064253 A1* | 3/2018 | DeMore | A47G 9/10 |
| 2018/0078062 A1* | 3/2018 | Pearce | A47G 9/1027 |
| 2018/0140116 A1* | 5/2018 | Werner | A47G 9/0253 |
| 2018/0192799 A1* | 7/2018 | Fulkerson | A47G 9/1081 |
| 2018/0199738 A1* | 7/2018 | Klein | A47G 9/10 |
| 2018/0230630 A1* | 8/2018 | Herrlich | D04H 1/00 |
| 2018/0280216 A1* | 10/2018 | Mascull | A61G 5/10 |
| 2018/0303257 A1 | 10/2018 | Alletto | |
| 2018/0305199 A1* | 10/2018 | Pearce | B68G 7/06 |
| 2018/0317676 A1 | 11/2018 | Alletto | |
| 2018/0317677 A1* | 11/2018 | Genao | A47G 9/1045 |
| 2019/0017200 A1* | 1/2019 | Alletto, Jr. | A47C 31/006 |
| 2019/0023861 A1* | 1/2019 | Alletto, Jr. | D06M 15/643 |
| 2019/0191895 A1* | 6/2019 | Shek | A47G 9/007 |
| 2019/0200787 A1 | 7/2019 | Alletto | |
| 2019/0249343 A1 | 8/2019 | Alletto | |
| 2019/0282005 A1 | 9/2019 | Alletto | |
| 2020/0214479 A1* | 7/2020 | Elliott | A47G 9/1036 |
| 2020/0237544 A1* | 7/2020 | Cutler | A61K 9/12 |
| 2021/0307959 A1* | 10/2021 | Abramson | A61F 7/02 |
| 2022/0015547 A1* | 1/2022 | Hung | H04W 4/80 |
| 2022/0031085 A1* | 2/2022 | Sheikh | A47C 27/064 |

FOREIGN PATENT DOCUMENTS

| | | |
|---|---|---|
| KR | 200420032 Y1 | 7/2006 |
| KR | 20130033007 A | 4/2013 |

* cited by examiner

COOLING BEDDING PRODUCT

TECHNICAL FIELD

The disclosure is directed to a cooling bedding product and in particular to a cooling pillow having a gel layer and memory foam layer.

BACKGROUND AND SUMMARY

Bedding products are being constantly improved to provide users with more comfortable sleeping experiences. One of the recent advances in bedding products has been the introduction of bedding products that remove body heat from the user to provide more comfortable sleeping conditions, particularly during warm weather conditions or in warmer climates. The problem has been how to design bedding products that can be manufactured efficiently and yet provide the desired cooling function while maintaining a pleasant feel to the bedding product.

In view of the foregoing, an embodiment of the disclosure provides a bedding product having an integrated cooling layer therein. The bedding product includes a flexible gel layer having an outside surface, a bonding surface opposite the outside surface, and a length and a width defining a gel layer perimeter. A memory foam layer surrounds the gel layer perimeter and disposed the bonding surface of the flexible gel layer. A textile covering layer having a first rectangular portion and a second rectangular portion affixed on a perimeter thereof to the first rectangular portion retains the flexible gel layer and memory foam layer therebetween. The textile covering layer have a cooling surface, an opposing surface opposite the cooling surface, and at least one vent disposed adjacent to an edge portion of the first or second rectangular portion. The flexible gel layer contains a plurality of hexagonal prism-shaped protrusions on the outside surface thereof, and the flexible gel layer and memory foam layer have a plurality of air conduits therein for air flow communication with the at least one vent.

In another embodiment, there is provided a method for making a bedding product having a cooling surface. The method includes forming a flexible gel layer from a polyurethane composition; curing the flexible gel layer to provide a cured flexible gel layer; placing the cured flexible gel layer in a mold; pouring a polyurethane foam composition in the mold to cover the cured flexible gel layer and to surround a perimeter of the cured flexible gel layer; and curing the polyurethane foam composition to provide a memory foam layer adjacent to the flexible gel layer.

In some embodiments, the flexible gel layer comprises a polyurethane foam gel layer.

In some embodiments, the memory foam layer comprises a polyurethane memory foam material.

In some embodiments, the bedding product is a pillow.

In some embodiments, the textile layer comprises a mixture of polyolefin and polyester fibers.

In some embodiments, the at least one vent comprises a woven polyester mesh.

In some embodiments, the bedding product contains a first vent and a second vent disposed on opposing edge portions of the first rectangular portion.

In some embodiments, the flexible gel layer has a thickness ranging from about 4 to about 8 mm.

In some embodiments, the memory foam layer has a thickness ranging from about 6 to about 16 cm.

In some embodiments, the flexible gel layer and memory foam layer have from 8 to 15 air conduits disposed from the outside surface of the flexible gel layer through the memory foam layer.

An advantage of the disclosed embodiments is that it provides a bedding product having a cooling effect that can be manufactured with a minimum of processing steps. Another advantage is that the bedding product provides an effective cooling system that provides improved comfort for sleeping.

DETAILED DESCRIPTION

Figure 1:
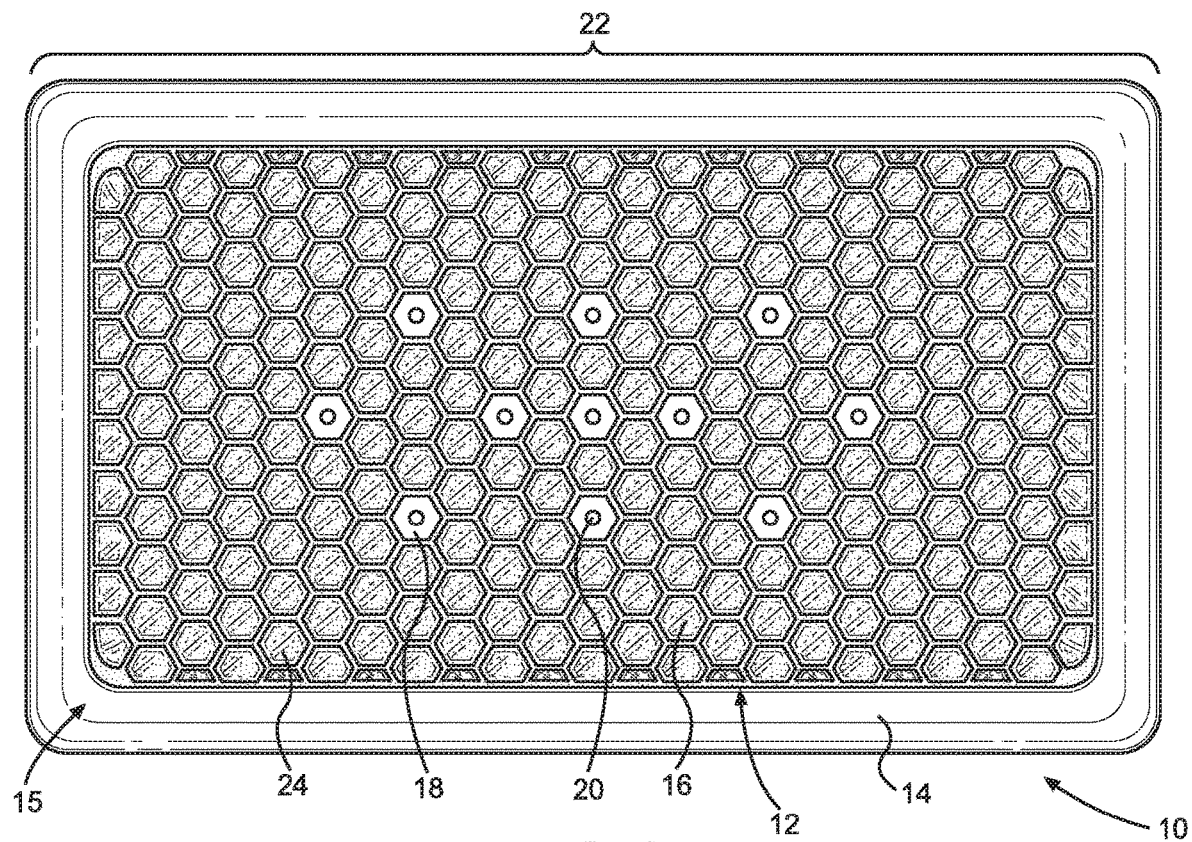
FIG. 1 is a top plan view of a bedding product according to the disclosure showing a flexible gel layer integrally formed with a lower memory foam layer.
Figure 2:
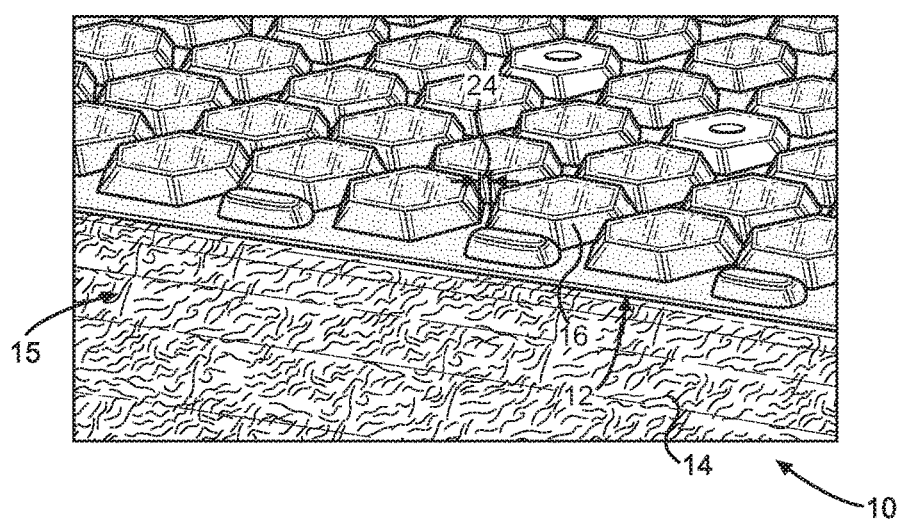
FIG. 2 is a partial perspective view of the gel layer and memory form layer of FIG. 1.

With reference to FIGS. 1 and 2, there is shown a bedding product 10 containing a flexible gel layer 12 disposed on a memory foam layer 14 covered with a thermoplastic polyurethane (TPU) film 15 between the flexible gel layer 12 and the memory foam layer 14. The flexible gel layer 12 includes a plurality of hexagonal prism-shaped protrusions 16 over the surface thereof, and one or more rows of hexagonal prism-shaped openings 18 in the gel layer, wherein the openings are filled with memory foam and contain air conduits 20 therein for air flow from the surface of the gel layer 12 to an opposing surface of the bedding product 10. The air conduits 20 are orthogonal to a longitudinal axis 22 defined by the memory foam layer 14. As can be better seen in FIG. 2, there are gaps or depressions 24 between adjacent hexagonal prism-shaped protrusions 16 for flow of air along the surface of the flexible gel layer 12 to and from the air conduits 20 during use.

Figure 3:
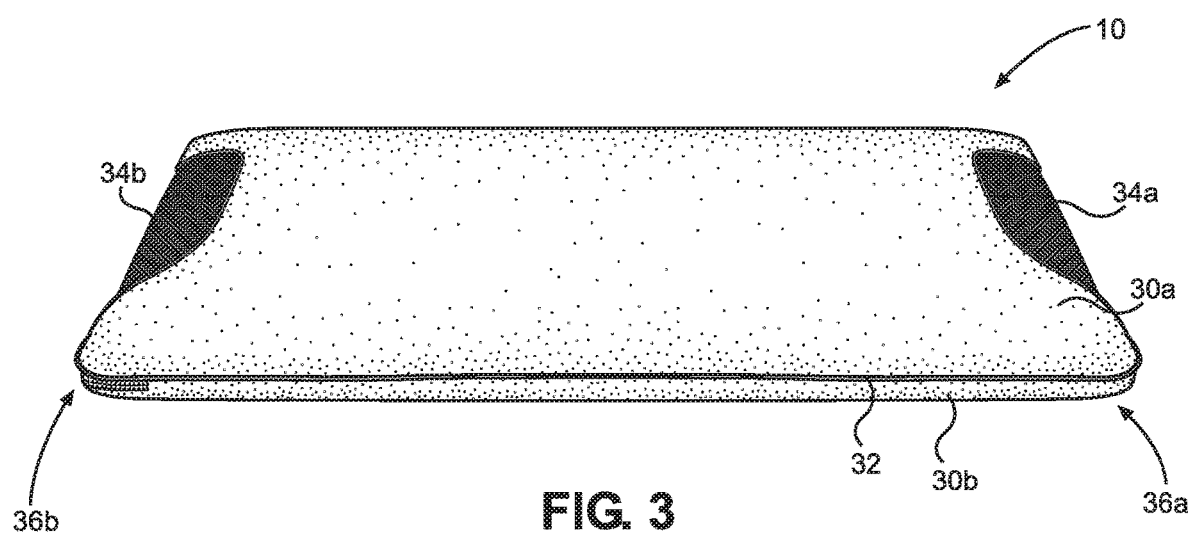
FIG. 3, is a perspective side view of the bedding product of FIG. 1 containing a textile covering layer.
Figure 4:
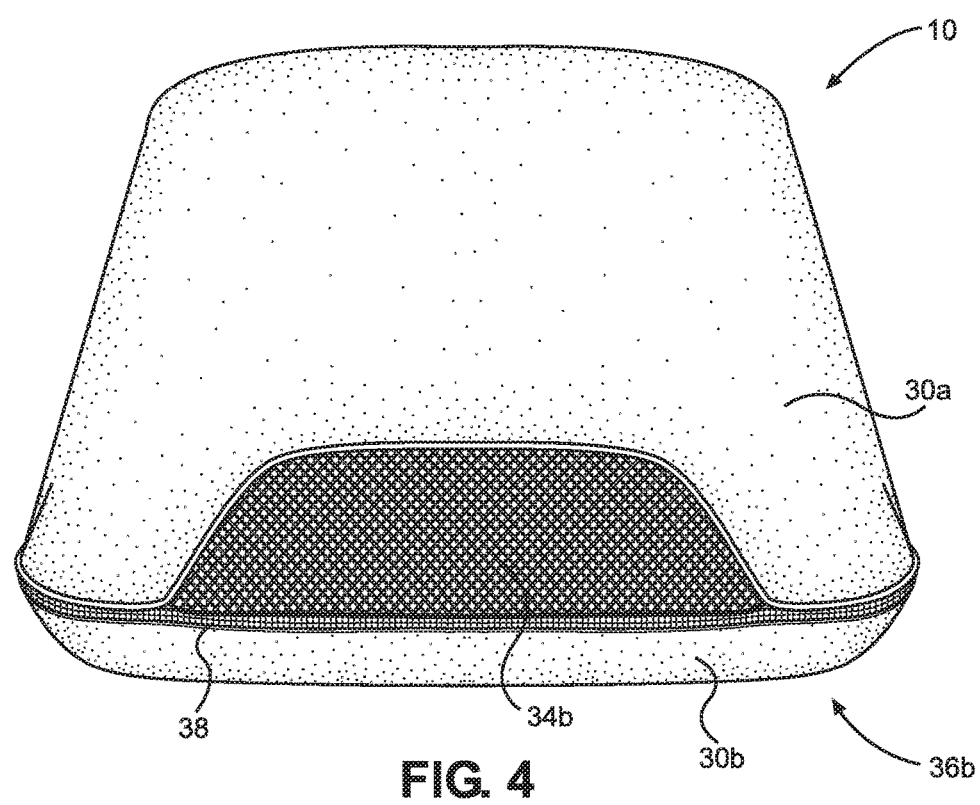
FIG. 4, is a perspective end view of the bedding product of FIG. 1 containing a textile covering layer.

As shown in FIGS. 3 and 4, the bedding product 10 is covered with a textile covering 30a and 30b. The textile covering 30a/30b is made of a mixture of polyolefin and polyester fibers. In particular, the textile covering 30a/30b includes from about 50 to about 60% by weight polyolefin fibers and from about 40 to about 50% by weight polyester fibers. The polyolefin fibers are selected from polyethylene and polypropylene and particularly flexible polyethylene fibers. The textile covering 30a/30b is suitably a woven fabric made of the polyolefin and polyester fibers. Each of the components of the textile covering 30a and 30b are joined together by a seam cord 32.

Figure 5:
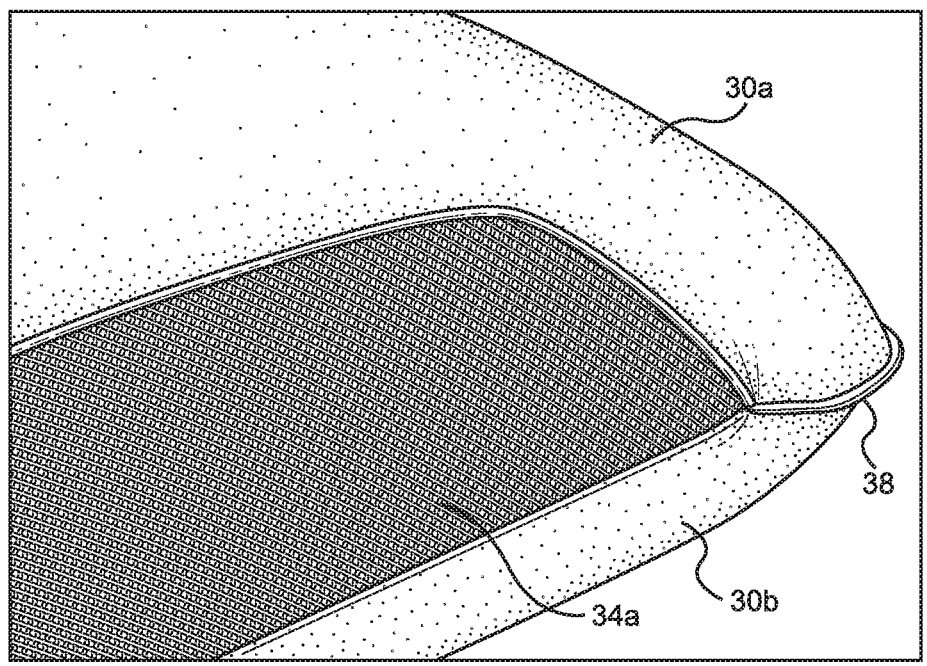
FIG. 5 is a partial perspective view of a mesh vent on one side edge of the bedding product.

The textile covering 30a/30b also includes opposing, trapezoidal-shaped vents 34a and 34b on ends 36a and 36b respectively of the bedding product 10. Each of the vents 34a and 34b is made of an open-weave 100 wt. % polyester fabric that provides a flow of air into and out of the textile covering 30a/30b. A zipper 38 may be provided on one end 34a or 34b for access to the interior of the textile covering 30a/30b. FIG. 5 provides a close-up view of the vent 34a showing the open weave polyester fabric.

Figure 6:
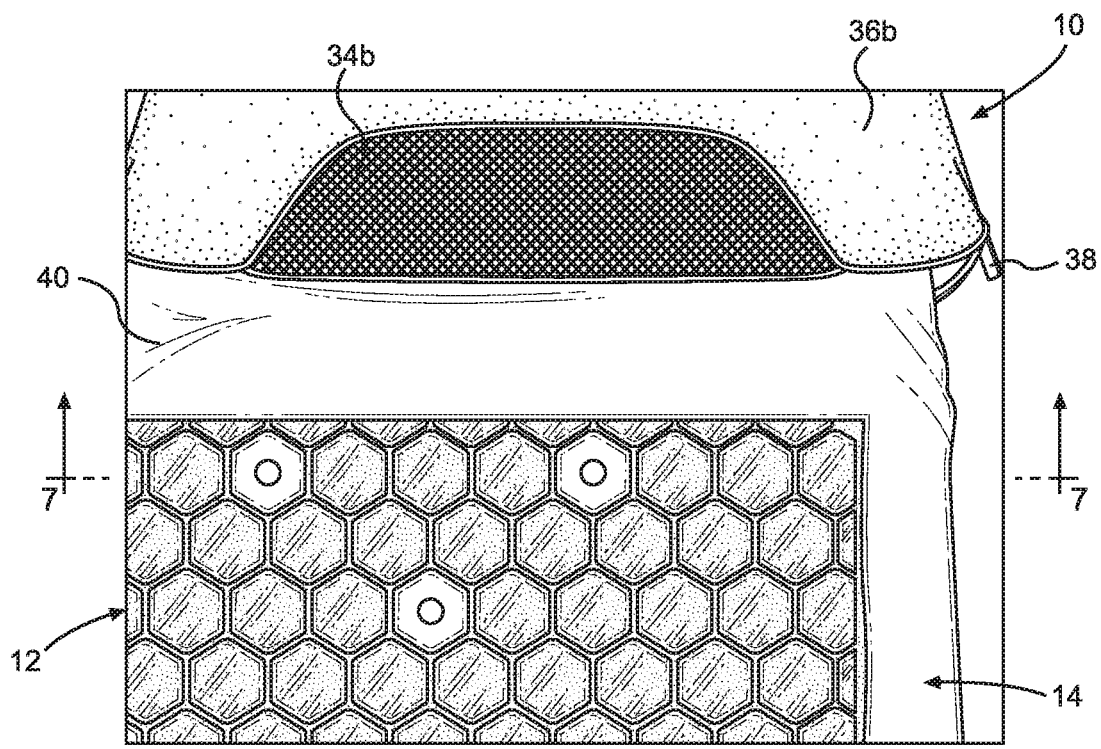
FIG. 6 is a partial top plan view of the bedding product of FIG. 1 showing a textile protective layer and a textile covering layer.
Figure 7:
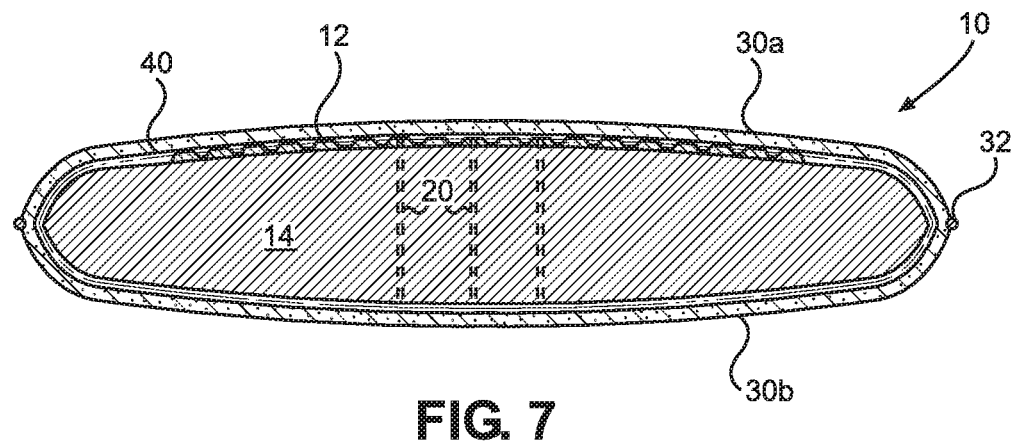
FIG. 7 is a cross-sectional end view, not to scale, of the bedding product of FIG. 1 showing a location of air conduit rows through the bedding product.
Figure 8:
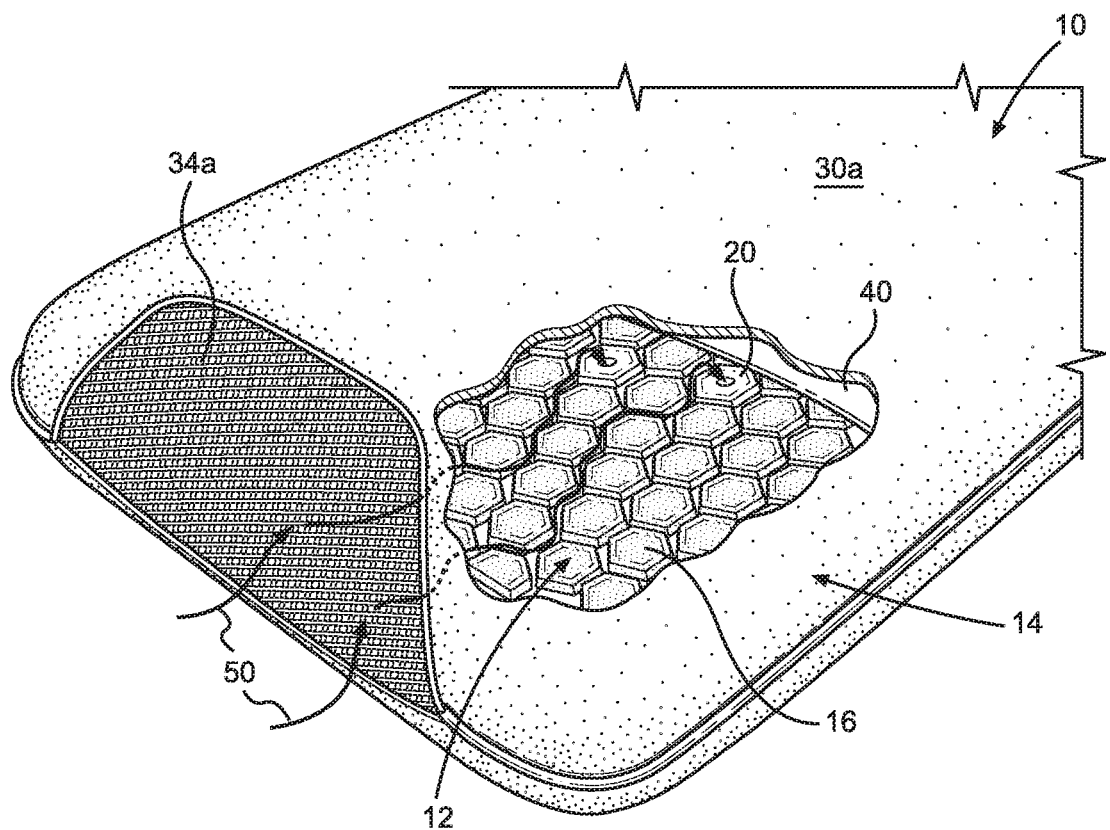
FIG. 8 is a perspective, partly cutaway view showing the flow of air through the bedding product of FIG. 1.

FIG. 6 is a plan view of the bedding product 10 showing the flexible gel layer 12 disposed on the memory foam layer 14, a woven fabric cover 40 encasing the gel layer 12 and memory foam layer 14, and the textile covering 30a having vent 34b therein. The woven fabric cover 40 is made of 35 wt. % cotton and 65 wt. % polyester. FIG. 7 is a cross-sectional view of the bedding product of FIG. 6 showing the air conduits 20 extending through the memory foam layer 14 from the gel layer 12 to the opposing side of the memory foam layer 14. FIG. 8 is a partial cut-away view of the bedding product 10 showing the flow of air, indicated by arrows 50 from the vent 34a between the hexagonal prism-shaped protrusions 16 to the air conduits 20.

A primary component of the bedding product 10 according to the disclosure is the flexible gel layer 12. The flexible gel layer 12 is a polymerization product of polyether polyol, zinc catalyst, plasticizer and isocyanate that are combined in a particular proportion to produce a gel with superior performance. An advantage the flexible gel layer 12 made according to the following description is that the gel layer 12 has (a) a delicate and soft hand, (b) is clear and transparent, (c) provides good cooling characteristics, (d) has relatively high toughness, and (e) is suitable for processing high-quality bedding products, such as memory foam pillows having a cooling effect on the user.

For the purposes of this disclosure the term "gel" refers to a nonfluid polymer network that is expanded throughout its whole volume by a fluid. Under appropriate conditions, the polymer solution and some sols will transform into an elastic semi-solid thick material, losing fluidity. This phenomenon is called gelation, and the resulting product is called gel or jelly. Colloidal particles or polymers in the sol or solution are connected to each other under certain conditions to form a spatial network structure, and the structural voids are filled with liquid as a dispersion medium.

The gel layer 12 is made using a polyether polyol having a hydroxyl value ranging from about 32 to about 35 mgKOH/g, and a number average molecular weight of about 3000. The reaction mixture includes about 50 to about 80 parts by of the polyether polyol, from about 0.2 to about 0.5 wt. % catalyst, and from about 10 to about 30 parts by weight isocyanate. A particularly suitable catalyst is a zinc catalyst. The plasticizer may be selected from a wide variety of plasticizers, including but not limited to, phthalic acid diesters (also known as "phthalates") such as dialkyl phthalates, such as di-C6-C13-alkyl phthalates, and alkyl benzyl phthalates, dialkyl terephthalates, epoxides, aliphatic carboxylic diesters, polyester-type polymers, adipic polyesters, phosphate esters, such as triaryl and alkylaryl phosphates, trimellitate esters, benzoate and dibenzoate esters, citrate esters and alkyl sulphonic esters of phenol and mixtures thereof. A particularly suitable plasticizer is cyclohexane-1,2-diisonyl dicarboxylate.

In order to prepare the flexible gel layer 12, the polyether polyol, catalyst and plasticizer are added to a reaction vessel and stirred and mixed at a speed of 500 rpm for about 30 minutes. After being uniformly mixed, the reaction mixture is placed into a first injection cylinder. The isocyanate is placed into a second injection cylinder. The reaction mixture and isocyanate in the injection cylinders are controlled at a temperature of about 30 to about 40° C. The materials in the first and second injection cylinders are then injected into a premixing tank. After mixing the materials from the two injection cylinders premixing tank at about 2000 rpm, the mixed material is flowed into a mold for polymerization of the mixed material. The mold is lined with a thermoplastic polyurethane (TPU) film having a thickness ranging from about 0.01 to about 0.03 mm, such as about 0.02 mm. The TPU film is held in the mold by a vacuum. The mold temperature is maintained at a temperature ranging from about 50 to about 70° C., such as about 60° C. and the mixed material for polymerization is injected into the mold. The mixed material is polymerized in the mold at the mold temperature for about 4 to about 6 minutes, such as 5 minutes to form the gel layer 12. When the polymerization reaction is complete, the gel layer 12 is removed from the mold and covered with a release paper The resulting flexible gel layer 12 made by the foregoing procedure has a delicate and soft hand, is clear and transparent, has suitable cooling characteristics, high toughness, and is suitable for processing high-quality gel products.

The memory foam layer 14 is made from reaction mixture that includes about 100 parts by weight of polyether polyol, from about 0.1 to about 0.8 parts by weight of amine catalyst, from about 0.05 to about 0.15 parts by weight of tin catalyst, from about 1.5 to about 3 parts by weight of aqueous blowing agent, from about 1 to about 10 parts by weight of auxiliary blowing agent, from about 0.1 to about 1 part by weight of crosslinking agent, from about 1 to about 3 parts by weight of homogenizing agent, and from about 45 to about 65 parts of modified MDI, wherein the modified MDI includes a mixture of diphenylmethane diisocyanate and polyphenylmethane polyisocyanate, having a percentage of isocyanate groups controlled at about 20 mol % to about 35 mol %, and having an isocyanate index ranging from about 88 to about 96.

In some embodiments, the polyether polyol is formed by mixing from about 30 to about 60 parts by weight of polyether polyol A, from about 10 to about 40 parts by weight of polyether polyol B, and from about 30 to about 60 parts by weight of polyether polyol C. Polyether polyol A uses glycerin as an initiator and ethylene oxide as a blocked polyether triol. The number average molecular weight of the polyether polyol A ranges from about 4000 to about 6000. Polyether polyol B is a polyether glycol with glycerol as the initiator and propylene oxide as the end cap. The polyether polyol B has a number average molecular weight ranging from about 600 to about 800. Polyether polyol C is a polyether diol using propylene glycol as the starting agent and propylene oxide as the end cap. The polyether polyol C has a number average molecular weight ranging from about 1500 to about 2500.

The amine catalyst is a tertiary amine catalyst that may be selected from triethylenediamine, bis(2-dimethylaminoethyl)ether, N,N-dimethylcyclohexylamine, N,N,N',N'-tetramethylpropanediamine, N,N,N',N'-tetramethylbutanediamines, N,N,N',N'-tetramethylhexamethylenediamine, N,N,N',N'',N''-pentamethyldiethylenetriamine, N,N,N',N'',N''-pentamethyldipropylenetriamine, 1,4-dimethylpiperazine, N-(2-dimethylaminoethyl)morpholine, N-(3-dimethylaminopropyl)imidazole, N,N-dimethylethanol amine, N,N,N'-trimethylaminoethylethanolamine, and 1-methyl-4-(2-dimethylaminoethyl)piperazine. A particularly useful tertiary amine catalyst is 1-methyl-4-(2-dimethylaminoethyl)piperazine.

The tin catalyst is a reaction product of tin with an alkanoic acid. A particularly useful tin catalyst is tin(II) 2-ethylhexanoate.

The crosslinking agent may be selected from one or more alkanol amines and alkydiols. A suitable crosslinking agent is diethanolamine, 1,4-butanediol, or a mixture thereof.

Other ingredients include a blowing agent, a foam leveling agent and an auxiliary blowing agent. The foam leveling agent may be a polysiloxane-dipropylene glycol block copolymer.

Each component for making the memory foam layer is placed in a cylinder with a metering pump, and the metering pump proportionally sprays the components into a foaming agent mixing chamber. After the components are thoroughly mixed, the mixture is pumped through a foaming tube to a foaming tank to be thoroughly mixed with the foaming agent. The release paper is removed from the pre-formed flexible gel layer 12, and the flexible gel layer 12 is placed in the bottom half of the memory foam mold with the TPU film on the flexible gel layer 12 being exposed to the upper half of the memory foam mold. The memory foam mixture is then flowed into the memory foam mold containing the flexible gel layer and the memory foam mixture and the mold is closed with the upper portion of the memory foam mold. The memory foam mixture is cured at a mold temperature ranging from about 30 to about 50° C. for from about 3 to about 7 minutes to provide the memory foam layer 14 that is adhered to the TPU film and flexible gel layer.

An advantage of the process it that the flexible gel layer is fixedly attached to the memory foam layer without a separate laminating step or the need for a separate step of coating the flexible gel layer or memory foam layer with an adhesive to attach the two layers to one another.

The description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A bedding product having an integrated cooling layer therein, the bedding product comprising:
    a single flexible gel layer having an outside surface, a bonding surface opposite the outside surface, and a length and a width defining a gel layer perimeter, wherein the flexible gel layer contains a plurality of hexagonal prism-shaped protrusions on the outside surface thereof,
    a memory foam layer surrounding the gel layer perimeter and disposed on the bonding surface of the flexible gel layer;
    a textile covering layer having a first rectangular portion and a second rectangular portion affixed on a perimeter thereof to the first rectangular portion for retaining the flexible gel layer and memory foam layer therebetween, the textile covering layer have a cooling surface, an opposing surface opposite the cooling surface, and at least one vent disposed adjacent to an edge portion of the first or second rectangular portion, and
    one or more rows of hexagonal prism-shaped openings in the flexible gel layer, wherein each of the hexagonal prism-shaped openings is filled with memory foam and contains an air conduit port therein for air flow from the outside surface of the gel layer to an opposing surface of the bedding product through a corresponding air conduit through the memory foam layer orthogonal to a longitudinal axis of the memory foam layer, wherein each air conduit is in air flow communication with the at least one vent.

2. The bedding product of claim 1, wherein the flexible gel layer comprises a polyurethane foam gel layer.

3. The bedding product of claim 1, wherein the memory foam layer comprises a polyurethane memory foam material.

4. The bedding product of claim 1, wherein the bedding product is a pillow.

5. The bedding product of claim 1, wherein the textile layer comprises a mixture of polyolefin and polyester fibers.

6. The bedding product of claim 1, wherein the at least one vent comprises a woven polyester mesh.

7. The bedding product of claim 1, wherein the bedding product contains a first vent and a second vent disposed on opposing edge portions of the first rectangular portion.

8. The bedding product of claim 1, wherein the flexible gel layer has a thickness ranging from about 4 to about 8 mm.

9. The bedding product of claim 1, wherein the memory foam layer has a thickness ranging from about 6 to about 16 cm.

10. The bedding product of claim 1, wherein the flexible gel layer and memory foam layer have from 8 to 15 air conduits disposed from the outside surface of the flexible gel layer through the memory foam layer, wherein each air conduit has a diameter ranging from 5 to 10 mm.

11. A method for making a bedding product having a cooling surface, comprising:
    forming a flexible gel layer from a polyurethane composition;
    curing the flexible gel layer to provide a cured flexible gel layer;
    placing the cured flexible gel layer in a mold;
    pouring a polyurethane foam composition in the mold to cover the cured flexible gel layer and to surround a perimeter of the cured flexible gel layer;
    curing the polyurethane foam composition to provide a memory foam layer adjacent to the flexible gel layer, wherein the flexible gel layer is disposed on only one side of the memory foam layer and the flexible gel layer contains a plurality of hexagonal prism-shaped protrusions on the outside surface thereof, wherein the bedding product further includes one or more rows of hexagonal prism-shaped openings in the flexible gel layer, wherein each of the hexagonal prism-shaped openings is filled with memory foam and contains an air conduit port therein for air flow from an outside surface of the gel layer to an opposing surface of the bedding product through a corresponding air conduit through the memory foam layer orthogonal to a longitudinal axis of the memory foam layer; and
    encasing the memory foam layer and flexible gel layer in a textile covering material, wherein the textile covering material comprises at least one woven polyester mesh vent therein.

12. The method of claim 11, wherein the textile covering material comprises a mixture of polyolefin and polyester fibers.

13. The method of claim 11, wherein the flexible gel layer has a thickness ranging from about 4 to about 8 mm.

14. The method of claim 11, wherein the memory foam layer has a thickness ranging from about 6 to about 16 cm.

15. The method of claim 11, wherein the flexible gel layer and memory foam layer have from 8 to 15 air conduits disposed therethrough.

\* \* \* \* \*